United States Patent
Jouanlanne et al.

(10) Patent No.: US 10,693,219 B2
(45) Date of Patent: Jun. 23, 2020

(54) ELECTRONIC APPARATUS COMPRISING AN ANTENNA STRUCTURE FOR THE EMISSION AND/OR THE RECEPTION OF RADIOELECTRIC SIGNALS AND A STRAP SERVING AS A FASTENER OF THE APPARATUS

(71) Applicant: SIGFOX, Labege (FR)

(72) Inventors: Cyril Jouanlanne, Toulouse (FR); Christophe Fourtet, Pompignan (FR)

(73) Assignee: SIGFOX, Labege (FR)

( * ) Notice: Subject to any disclaimer, the term of this patent is extended or adjusted under 35 U.S.C. 154(b) by 1 day.

(21) Appl. No.: 16/326,703

(22) PCT Filed: Sep. 1, 2017

(86) PCT No.: PCT/EP2017/071960
§ 371 (c)(1),
(2) Date: Feb. 19, 2019

(87) PCT Pub. No.: WO2018/041996
PCT Pub. Date: Mar. 8, 2018

(65) Prior Publication Data
US 2019/0190130 A1 Jun. 20, 2019

(30) Foreign Application Priority Data
Sep. 2, 2016 (FR) ...................... 16 58194

(51) Int. Cl.
*H01Q 1/27* (2006.01)
*H01Q 7/00* (2006.01)
(Continued)

(52) U.S. Cl.
CPC ............. *H01Q 1/273* (2013.01); *H01Q 1/243* (2013.01); *H01Q 1/27* (2013.01); *H01Q 1/36* (2013.01);
(Continued)

(58) Field of Classification Search
CPC ............ H01Q 1/273; H01Q 1/48; H01Q 7/00; H01Q 1/243; H01Q 1/38; H01Q 5/328;
(Continued)

(56) References Cited

U.S. PATENT DOCUMENTS

| 4,754,285 A | 6/1988 | Robitaille |
| 4,922,260 A | 5/1990 | Gaskill et al. |

(Continued)

*Primary Examiner* — Vibol Tan
(74) *Attorney, Agent, or Firm* — Im IP Law; Chai Im; C. Andrew Im

(57) ABSTRACT

Apparatus includes an antenna to emit and/or receive radioelectric signals and a strap configured to fasten the apparatus. The antenna includes an antenna loop. The antenna loop includes a conducting plate and a case containing an electronic circuit and having at least one conducting face which extends parallel opposite the conducting plate. The conducting plate and the conducting face of the case are connected electrically together on one side of the conducting face of the case and on the other side are connected electrically with the electronic circuit. The strap includes a conductive portion forming an antenna ground of the antenna and electrically insulated from the conducting plate. The conducting portion of the strap is in capacitive coupling with the conducting plate.

11 Claims, 3 Drawing Sheets

US 10,693,219 B2
Page 2

(51) Int. Cl.
 *H01Q 1/24* (2006.01)
 *H01Q 1/48* (2006.01)
 *H04B 1/3827* (2015.01)
 *H01Q 1/36* (2006.01)

(52) U.S. Cl.
 CPC ............... *H01Q 1/48* (2013.01); *H01Q 7/00* (2013.01); *H04B 1/385* (2013.01); *H04B 2001/3861* (2013.01)

(58) Field of Classification Search
 CPC . H04B 1/385; H04B 2001/3861; G06F 1/163; G04R 60/06; G04R 60/04; G04R 60/12; G04R 60/08; G04R 60/10; A61B 5/681
 See application file for complete search history.

(56) References Cited

U.S. PATENT DOCUMENTS

| | | | |
|---|---|---|---|
| 4,977,614 A | 12/1990 | Kurcbart | |
| 5,134,724 A | 7/1992 | Gehring et al. | |
| 5,179,733 A | 1/1993 | Matsui | |
| 5,189,431 A | 2/1993 | Marinelli | |
| 6,350,055 B1 | 2/2002 | Barras | |
| 9,172,148 B2 * | 10/2015 | Lyons | H01Q 1/273 |
| 9,257,740 B2 * | 2/2016 | Lyons | H01Q 1/273 |
| 9,705,549 B1 * | 7/2017 | Erentok | H04W 4/203 |
| 9,737,119 B2 * | 8/2017 | Lee | A44C 5/147 |
| 9,998,182 B2 * | 6/2018 | Huang | H04B 5/0031 |
| 10,271,299 B1 * | 4/2019 | Sayem | H01Q 1/273 |
| 10,303,122 B2 * | 5/2019 | Choi | A44C 5/0053 |
| 10,476,139 B2 * | 11/2019 | Park | H01Q 1/36 |
| 10,478,099 B2 * | 11/2019 | Lor | A61B 5/1122 |
| 10,484,112 B2 * | 11/2019 | Pascolini | H01Q 1/273 |
| 2005/0054321 A1 | 3/2005 | Casagrande et al. | |
| 2006/0227058 A1 | 10/2006 | Zellweger et al. | |
| 2013/0016016 A1 * | 1/2013 | Lin | H01Q 1/273 343/702 |
| 2016/0058133 A1 * | 3/2016 | Fournier | A61B 5/091 455/41.2 |
| 2016/0141746 A1 * | 5/2016 | Kim | H01Q 1/50 343/718 |
| 2016/0218762 A1 * | 7/2016 | Tian | H04M 1/0256 |
| 2016/0363957 A1 * | 12/2016 | Stroetmann | G06F 1/189 |

* cited by examiner

CROSS-SECTION Y-Z

CROSS-SECTION X-Z

TOP VIEW

ELECTRONIC APPARATUS COMPRISING AN ANTENNA STRUCTURE FOR THE EMISSION AND/OR THE RECEPTION OF RADIOELECTRIC SIGNALS AND A STRAP SERVING AS A FASTENER OF THE APPARATUS

RELATED APPLICATIONS

This application is a § 371 application of PCT/EP2017/071960 filed Sep. 1, 2017, which claims priority from French Patent Application No. 16 58194 filed Sep. 2, 2016, each of which is incorporated herein by reference in its entirety.

TECHNICAL FIELD

The present invention belongs to the field of radioelectric telecommunications, and relates more particularly to an apparatus comprising an electronic circuit, an antenna for the emission and/or the reception of radioelectric signals for wireless communication with an access network, and a strap serving as a fastener of the apparatus.

BACKGROUND OF THE INVENTION

The present invention has a particularly advantageous, although in no way limiting, use in the case of apparatuses of the smartwatch type, in which the strap is a bracelet serving as a fastener to the wrist for them. Such smartwatches can communicate via radioelectric links in the frequency bands lower than 3 GHz, or even more, either for telecommunications functions (2G, 3G, 4G and others), for exchanges of data via Bluetooth, for communications between machines (Internet of things) such as the networks Sigfox or "Wi-Fi", or for functions of positioning via satellites like the systems "GPS" or "GALILEO", for example.

Another example of use of the invention is that of apparatuses of the animal collar type, allowing to locate them via positioning by satellites, or by triangulation with respect to base stations of a terrestrial access network. The apparatus communicates their position via an ultra-narrow-band wireless communication system ("Ultra Narrow Band" or UNB in the Anglo-Saxon literature), in which the instantaneous frequency spectrum of the radioelectric signals transmitted between the terminals and the access network has a frequency width of less than 1 or 2 kHz. Such ultra-narrow-band communications are subject to standards, for example the "Low Throughput Networks (LTN)" standards and draft standards of the European Telecommunications Standards Institute (ETSI).

The apparatus comprises a case containing the electronic circuit. For the radioelectric emissions and receptions, it is known to incorporate an antenna into a bracelet with a galvanic connection between the antenna and the electronic circuit.

The U.S. Pat. Nos. 4,754,285, 4,922,260, 4,977,614, 5,134,724, 5,179,733, 5,189,431, EP 1489471, U.S. Pat. No. 6,350,055 describe examples of radioelectric-telecommunication apparatuses of this type. However, it is difficult to ensure the reliability of the galvanic connection between the antenna and the electronic circuit. On the one hand, the length of the bracelet is adjustable, or even elastic, in order to adjust to various sizes of wrists. On the other hand, the bracelet is mobile with respect to the case and the galvanic connection between the antenna and the electronic circuit is physically stressed. The case of a collar for an animal has analogous difficulties.

A simple antenna structure that is more reliable is desirable.

OBJECT AND SUMMARY OF THE INVENTION

The goal of the present invention is to overcome all or a portion of the limitations of the solutions of the prior art.

For this purpose, the invention relates to an apparatus for radioelectric communication comprising an electronic circuit, an antenna for the emission and/or the reception of radioelectric signals for wireless communication with an access network, and a strap serving as a fastener of the apparatus. The antenna comprises an antenna loop. The antenna loop includes a conductive plate and a case containing the electronic circuit and having at least one conductive face. The conductive plate of the antenna loop extends in parallel to and facing the conductive face of the case. The conductive plate and the conductive face of the case are electrically connected together on one side of the conductive face of the case and on the other side of the conductive face are electrically connected to the electronic circuit. The strap comprises a conductive portion forming an antenna ground of the antenna, said conductive portion extends in parallel to and facing the conductive plate and electrically insulated from said conductive plate, in such a way that said conductive portion is capacitively coupled to said conductive plate. There can also be an effect of inductive coupling between the conductive portion of the strap and the conductive plate, but typically the capacitive coupling is dominant.

No galvanic connection is necessary between the strap and the electronic circuit, thus avoiding any reduction in reliability caused by a relative movement. The conductive portion of the strap improves the antenna performance of the loop via the coupling between them, which can be partly inductive as well as capacitive. The conductive portion of the strap provides a ground-plane effect for the antenna assembly, even if it is not entirely flat but at least partly curved, and even if its surface is limited, in particular its dimension transverse to the strap. The strap can be entirely conductive, made of metal material for example, integrating the conductive portion, or the conductive portion can be attached onto an electrically insulating material of the strap.

The electronic circuit can comprise a radio module for the processing and/or the generation of radioelectric signals received and/or to be emitted by the antenna, and a module for impedance matching between the radio module and the antenna. The impedance-matching module allows to adapt the impedance of the antenna to that of the radio module in order to maximise the transmission of RF power between the radio module and the antenna and vice versa. The impedance-matching module can comprise a first capacitive component in series between the antenna and the radio module, and a second capacitive component between the antenna and the ground of the radio module.

The conductive plate of the antenna loop can be mechanically rigidly connected to the case and to the conductive portion of the strap, also avoiding any relative movement between them. The conductive plate of the antenna loop can be mounted on an electrically insulating spacer that is rigidly connected to the conductive portion of the strap. The insulating spacer can be part of a support on which the case is mounted. Alternatively, the support is removably mounted on the strap and comprises a magnet adapted for maintaining said support on said strap via magnetic attraction with the conductive portion of said strap.

The conductive face of the case of the antenna loop can be electrically connected to the ground of the electronic circuit and the conductive plate of the antenna loop can be electrically connected to an output and/or input line of the electronic circuit on one side of the case.

The conductive portion of the strap can extend beyond the conductive plate of the antenna loop and the conductive face of the case over all or a portion of the length of the strap.

The apparatus can comprise a display on a surface opposite to the conductive face of the case, the electronic circuit can have functionalities of a smartwatch, and the strap can be a bracelet adapted for attaching the apparatus to a human wrist.

The electronic circuit can have functionalities of geolocation and of emission of geolocation data to an access network, and the strap can be a collar adapted for attaching the apparatus to a neck, of a pet, or of a wild animal or bird, for example.

PRESENTATION OF THE DRAWINGS

Other features and advantages of the invention will appear clearly from the description that is made thereof below, for informational purposes and in no way limiting, in reference to the appended drawings, in which.

The elements of the drawings are illustrated in a spirit of simplicity and clarity, and are not necessarily to scale or realistic in terms of details. Identical references from one drawing to another designate identical or analogous elements.

DETAILED DESCRIPTION OF EMBODIMENTS

Figure 1:
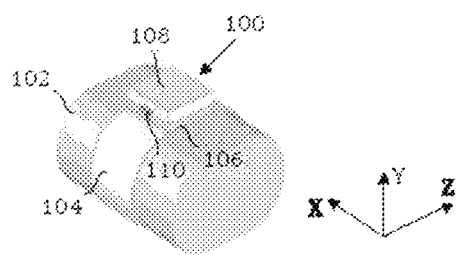
FIG. 1 is a stylised perspective view of a smartwatch on a human wrist according to an embodiment of the invention, given as an example.

FIG. 1 schematically shows a smartwatch 100 according to an embodiment of the invention, given as an example, on a human wrist 102. The watch 100 comprises an antenna for the emission and/or the reception of radioelectric signals for wireless communication with an access network, and a strap 104 in the form of a bracelet serving as a fastener of the apparatus to the wrist 102. The antenna comprises an antenna loop, the operation of which is illustrated by the elementary antenna loop 200 (FIG. 2), and an antenna ground, making a reflector. The antenna loop includes a conductive plate 106 and a case 108 containing the electronic circuit and having at least one conductive face, which is the lower face of the case 108, hidden in FIG. 1, and symbolised by the face 202 in FIG. 2. The conductive plate 106 extends in parallel to and facing the conductive face 202 of the case 108. The conductive plate 106 and the conductive face 202 of the case are electrically connected on one side of the case 108 to the radio frequency (RF) line of the electronic circuit in the case, as indicated at 110, in order to exchange electric signals with the electronic circuit. On the other side of the case 108 the conductive plate 106 and the conductive face 202 of the case are electrically connected together, as indicated at 204 in FIG. 2. In another specific embodiment of the invention, in which the RF line of the electronic circuit is differential, the conductive plate 106 and the conductive face 202 of the case have differential connections to the RF line.

Figure 3:
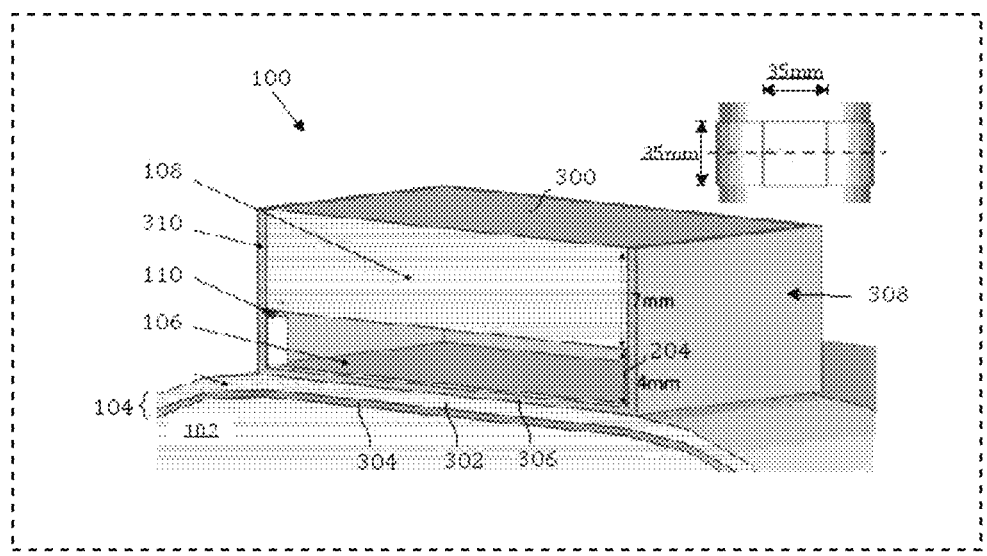
FIG. 3 illustrates a more detailed top view and perspective view of the watch of FIG. 1.

FIG. 3 illustrates the watch 100 in more detail. For example, the case 108 can have a square shape, 35 mm on the side and 7 mm in height. The sides, and even the set of faces, of the case 108 can be conductive, for example made of metal material, with an opening for the connections 110 between the RF line and the plate 106. The upper surface 300 of the case 108, opposite to the face 202, can comprise a display (not shown), optionally touch. The strap 104 comprises a conductive portion 302, which forms an antenna ground plane, attached onto a portion 304 of the strap that forms a bracelet, and the portion 304 of the strap can be made from an electrically insulating material. In another specific embodiment of the invention, the conductive portion 302 is integrated into the bracelet, and the bracelet can be made from a conductive material, metal for example. As illustrated in FIG. 3, the strap 104 does not have any interruption at the case 108, and extends over the entire length (along the axis Z of FIG. 1) of the conductive plate 106. The conductive portion 302 forming the antenna ground extends in parallel to said conductive plate 106 over the entire length of said conductive plate 106, and is electrically insulated from said conductive plate 106. The strap 104 can comprise a clasp (not shown) in order to attach the strap around the wrist 102, or can be elastic, allowing it to be slipped onto the hand.

Figure 2:
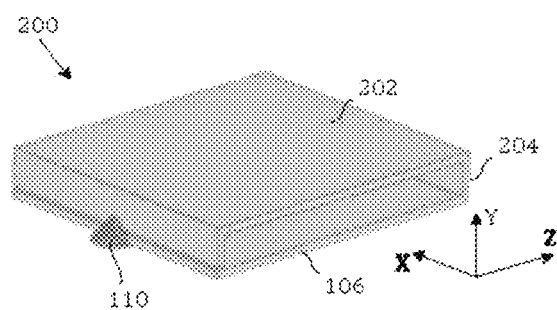
FIG. 2 is a perspective view of an elementary antenna loop corresponding to the operation of an antenna loop in the watch of FIG. 1.

A box made of electrically insulating material, plastic for example, serves as a support of the case 108, making the case mechanically rigidly connected to the conductive plate 106 of the antenna loop and to the conductive portion 302 of the strap, avoiding any relative movement between them. The supporting box comprises a spacer 306 made of electrically insulating material connecting the conductive plate 106 of the loop and the conductive portion 302 of the strap in order to maintain the spacing and the parallelism provided between them. The thickness of the spacer 306 can be for example between 0.1 mm and 1.0 mm (and in one example is 0.5 mm) for a frequency of the carrier signal of 0.9 GHz for example. The box also comprises walls 308 and 310 serving as a support for the case 108. The box can cover only two sides of the case 108, as illustrated, or can comprise two additional walls in such a way as to cover the four sides of the square case 108. The case and the box can have a shape other than the square illustrated, for example cylindrical. The space between the face 202 of the case and the conductive plate 106 of the antenna loop and between the walls 308 and 310 can be filled only with air or can be filled with insulating material, and in the example illustrated has a thickness of 4 mm. The electric connections to the electronic circuit can be on the edge, as indicated in FIG. 3, or at the centre of the side of the conductive plate 106, as indicated in FIGS. 1 and 2. The electric connections of the conductive plate 106 to the electronic circuit on the one hand, and to the face 202 of the case 108 on the other hand, can be spaced apart transversely from the wrist 102, as indicated in FIGS. 2 and 3, or longitudinally from the wrist. More generally, the conductive plate 106 and the conductive face 202 of the case are electrically connected in a first connection zone, and the conductive plate 106 and the conductive face 202 of the case are electrically connected to the electronic circuit in a second connection zone. The first connection zone and the second connection zone are in preferred embodiments distant from one another, for example separated by a distance that is greater than or equal to the smallest dimension of the conductive face 202 of said case among the dimensions measured along the axes respectively X and Z of FIG. 1 (the plane X-Z being parallel to said conductive face 202), as is the case in the examples of FIGS. 2 and 3 in which the first connection zone and the second connection zone are arranged in opposite sides of said case along the axis Z of FIG. 1.

In the case of a geolocation collar, the structure of the watch 100 is modified, by providing a length of the strap 104 adapted to the neck. No display like on the exposed face of the watch 100 is necessary and the electronic circuit inside the case 108 is modified in order to ensure the desired functionalities.

Figure 4:
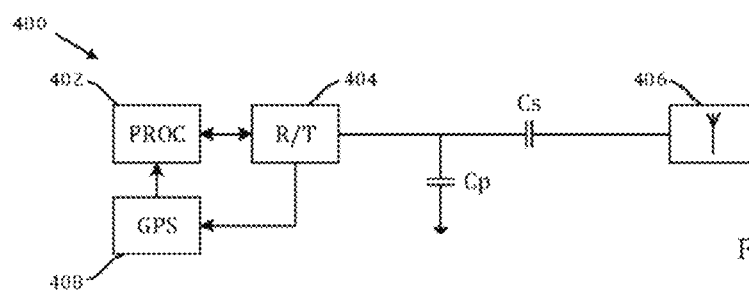
FIG. 4 is a block diagram of an electronic circuit in the watch of FIG. 1.

FIG. 4 illustrates an example of an electronic circuit 400 in the case 108. The electronic circuit 400 comprises a processor 402 processing the messages received or to be sent, an emitter and/or receiver 404, and a module for impedance matching between the radio module and the plate 106 of the antenna 406 in order to adapt the impedance of the antenna to that of the radio module in order to maximise the transmission of RF power between the radio module and the antenna and vice versa, the face 202 of the case 108 being connected to the ground of the electronic circuit 400. The impedance-matching module comprises a first capacitive component Cs in series between the antenna and the electronic circuit, and a second capacitive component Cp between the antenna and the ground of the electronic circuit. In the example of FIG. 3, the capacitances of the components are Cs=2.2 pF and Cp=6 pF, bringing the impedance that the antenna has to 50Ω and the resonance frequency to the frequency of the carrier signal of 0.9 GHz. The circuit 400 can also comprise a circuit 408 for positioning via GPS satellites with a second specific antenna (not drawn), receiving GPS signals from the receiver 404 and communicating the positioning data to the processor 402. The emitter 404 emits the geolocation data to an access network. The bandwidth obtained with the dimensions and features of this example is 12 MHz when taking the criterion that the return-loss scattering parameter $S_{11}<-10$ dB.

Figure 5:
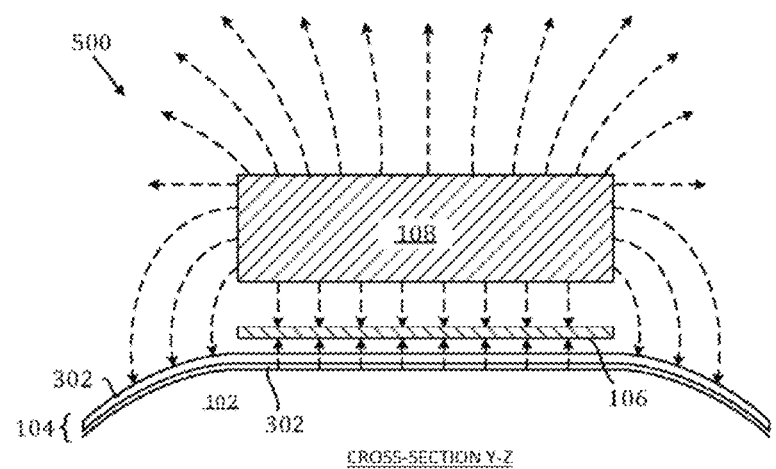
FIG. 5 is a cross-section along the plane Y-Z of the watch of FIG. 1 schematically illustrating the orientation of the lines of electric fields.
Figure 6:
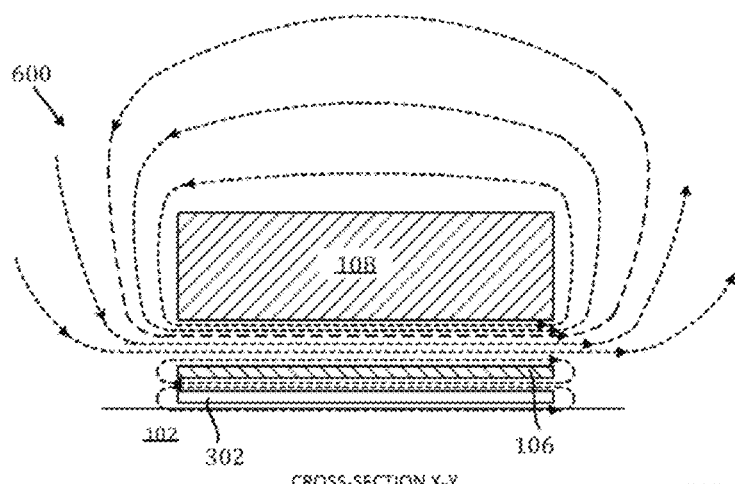
FIG. 6 is a cross-section along the plane X-Y of the watch of FIG. 1 schematically illustrating the orientation of the lines of magnetic fields.

FIG. 5 illustrates the lines of electric fields 500 in a transverse cross-section of the wrist in the plane Y-Z of FIG. 1. The arrows indicate the lines of electric fields during a cycle of the radioelectric signal, and are of course inverted at each cycle of the signal. The conductive plate 106 of the antenna loop induces electric charges in the conductive portion 302 of the strap 104, which acts as an antenna ground plane and reflector, and the charges circulating create currents in the conductive plate 106 and in the conductive portion 302 of the strap. FIG. 6 illustrates the lines of magnetic fields 600 in a longitudinal cross-section of the wrist in the plane X-Y of FIG. 1, and the lines of magnetic fields are created by and maintain the electric currents in the conductive plate 106 and the conductive portion 302 of the strap 104.

Figure 7:
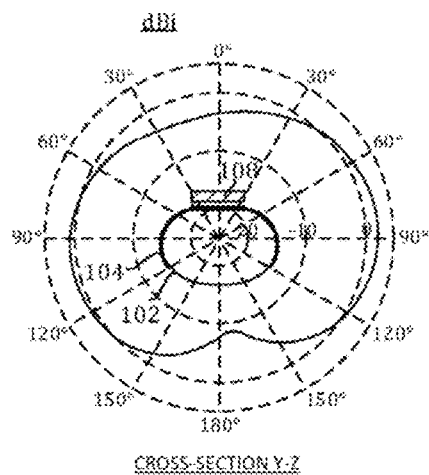
FIGS. 7 to 9 are gain diagrams of the antenna structure of the watch of FIGS. 1 to 6 in various planes, given as an example.
Figure 8:
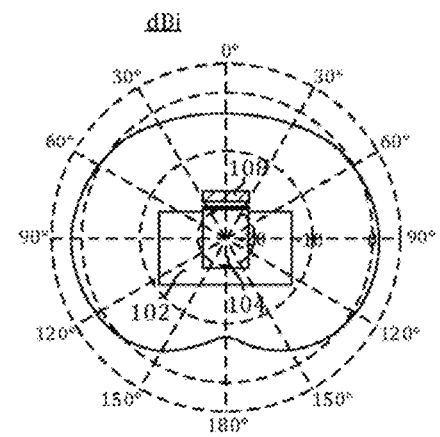
Figure 9:
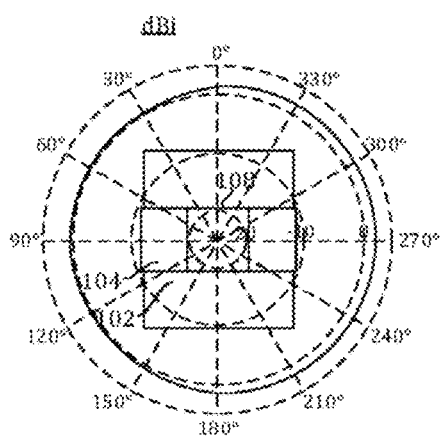

FIGS. 7 to 9 illustrate the gain of the antenna structure in planes that are respectively transverse to the wrist 102, longitudinal to the wrist, and viewed from above. The diagram of radiation of the antenna structure is omnidirectional. A total efficiency of 45% is obtained in the configuration presented and in the presence of the human wrist. In comparison, an efficiency of close to 100% is obtained in the absence of the wrist.

The length of the conductive portion 302 of the strap 104 has a limited impact on the efficiency of the antenna between a length of approximately 70 mm covering approximately 120° around the wrist 102, illustrated in FIG. 5, and a length of approximately 140 mm covering approximately 240° around the wrist 102, illustrated in FIG. 7. The length of the conductive portion 302 of the strap 104 does not have a significant impact on the frequency adjustment.

The electric contact or insulation of the conductive portion 302 of the strap 104 with respect to the skin of the wrist (conductive or insulating bracelet 304), and the filled or hollow case 108 do not have a significant impact on the matching module Cs, Cp.

The increase of the height of the case 108 from 1 mm to 11 mm increases the bandwidth and allows less losses in the matching module, and increases the efficiency of the antenna by 1 dB. The increase of the distance between the conductive face 202 of the case and the conductive plate 106 from 3 mm to 4 mm increases the bandwidth and increases the efficiency of the antenna by 0.5 dB.

Figure 10:
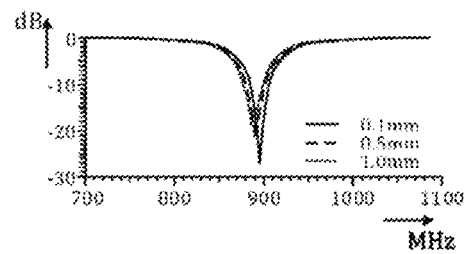
FIG. 10 is a graph illustrating the impact of various spacings between a conductive plate of the antenna loop and a conductive portion of a strap on the frequency adjustment in the watch of FIG. 1.

FIG. 10 illustrates the negative effect of the spacing between the conductive plate 106 of the loop and the conductive portion 302 of the strap between 0.1 mm, 0.5 mm and 1.0 mm, which is defined by the thickness of the spacer 306. The matching module Cs, Cp can be identical in all the cases and the impact on the efficiency of the antenna is sufficiently limited to make the mechanical tolerance of the thickness of the spacer 306 acceptable.

The box can be removably mounted on the strap 104 and retention means are provided in order to retain said box on said strap 104. For example, the retention means comprise a magnet (not shown in the drawings) that can be added in the middle of the conductive plate 106 of the loop without a notable impact on the performance of the antenna. This magnet is insulated from the antenna ground and also from the antenna, for example by positioning said magnet in a slot of the conductive plate 106. This magnet allows to maintain the box of the case 108 with respect to the antenna ground, by magnetic attraction to the conductive portion 302 forming said antenna ground. In specific embodiments, the strap 104 can comprise means for positioning said box with respect to the strap 104, for example such as a frame adjusted to the dimensions of said box or a plurality of spacers, allowing easy and precise assembly of the bracelet+ watch assembly.

More generally, it should be noted that the modes of implementation and embodiments considered above have been described as non-limiting examples, and that other alternatives are therefore possible. For example, the decoupling between logic blocks of the electronic circuit is illustrative and other decoupling of functionalities is possible in realisations of the invention, two blocks being able to be combined or separated. The system can comprise a plurality of antennas operating at different frequencies associated with respective emitter and/or receiver modules. The devices described can at least partly be made by processors or other units programmable with software.

The invention claimed is:

1. A radioelectric communication apparatus, comprising:
an electronic circuit;
a strap configured to serve as a fastener of the apparatus;
an antenna for at least one of emission and reception of radioelectric signals to facilitate a wireless communication with an access network, the antenna comprising an antenna loop, the antenna loop comprising a conductive plate and a case, the case comprising the electronic circuit and at least one conductive face;
the conductive plate of the antenna loop extending in parallel to and facing said at least one conductive face of the case;
the conductive plate being electrically connected to a first side of said at least one conductive face of the case and the electronic circuit being electrically connected to a second side of said at least one conductive face of the case; and
the strap comprising a conductive portion forming an antenna ground of the antenna, the conductive portion extending in parallel to and facing the conductive plate, the conductive portion being electrically insulated from the conductive plate such that the conductive portion is capacitively coupled to the conductive plate.

2. The apparatus according to claim 1, wherein the electronic circuit comprises a transmitter/emitter, a processor configured to process or generate the radioelectric signals received or to be emitted by the transmitter/receiver via the antenna, and an impedance-matching module to match an impedance between the transmitter/receiver and the antenna.

3. The apparatus according to claim 2, wherein the impedance-matching module comprises a first capacitive component in series between the antenna and the transmitter/receiver and a second capacitive component between the antenna and a ground of the electronic circuit.

4. The apparatus according to claim 1, wherein the conductive plate of the antenna loop is mechanically rigidly connected to the case and to the conductive portion of the strap.

5. The apparatus according to claim 4, wherein the conductive plate of the antenna loop is mounted on an electrically insulating spacer.

6. The apparatus according to claim 5, wherein the insulating spacer is part of a support on which the case is mounted.

7. The apparatus according to claim 5, wherein the support is removably mounted on the strap and the support comprises a magnet configured to maintain the support on the strap via a magnetic attraction with the conductive portion of the strap.

8. The apparatus according to claim 1, wherein said at least one conductive face of the case of the antenna loop is electrically connected to a ground of the electronic circuit; and wherein the conductive plate is electrically connected to an output or input line of the electronic circuit on one side of the case.

9. The apparatus according to claim 1, wherein the conductive portion of the strap extends beyond the conductive plate of the antenna loop and said at least one conductive face of the case over all or a portion of a length of the strap.

10. The apparatus according to claim 1, further comprising a display on a surface opposite to said at least one conductive face of the case; wherein the electronic circuit is configured to function as a smartwatch; and wherein the strap is a bracelet configured to attach the apparatus to a human wrist.

11. The apparatus according to claim 1, wherein the electronic circuit is configured to function as a geolocator and configured to transmit geolocation data to the access network; and wherein the strap is a collar configured to attach the apparatus to a neck.

* * * * *